Patented Oct. 11, 1949

2,484,469

UNITED STATES PATENT OFFICE 2,484,469

PROCESS

Benjamin B. Schaeffer, Niagara Falls, N. Y., assignor to Mathieson Chemical Corporation, a corporation of Virginia No Drawing. Application July 16, 1947, Serial No. 761,437

6 Claims. (Cl. 260—650)

This invention concerns a practical and economical method for separating alkaryl compounds comprising one or more side chain halogen atoms from mixtures with aromatic compounds free of side chain halogen atoms but having an unsaturated side chain.

The method is particularly valuable as applied in the separation of such alkaryl compounds from vinyl aromatic compounds which may or may not contain nuclear halogen atoms. Thus, it can be applied with excellent results in the separation of chloroethyl benzene from styrene, for example, or in the separation of chloro-isopropyl benzene from alpha methyl styrene or in the separation of chloroethyl dichlorobenzene from dichlorostyrene.

Styrene and nuclear dichlorostyrene, both of which are readily polymerized to plastics having great commercial untility, are conveniently produced by the dehydrochlorination of chloroethyl benzene and chloroethyl dichlorobenzene, respectively. However, the reaction mixture resulting on the dehydrochlorination in either case invariably contains substantial amounts of unreacted starting material. As compounds containing side chain chlorine adversely affect the rate and extent of polymerization of styrene and dichlorostyrene, it is necessary to subject the dehydrochlorination product to a treatment resulting in the removal of as much of the chloroethyl compound as possible. A large proportion of the offending compound can be separated, of course, by fractional distillation, but in order to meet product specifications it is frequently necessary to carry the distillation treatment beyond commercially practicable limits. Even small amounts of the chloroethyl compound, having little, if any, effect on the polymerization of the styrene or dicholorstyrene, are objectionable where the polymeric material is to be employed in a molding operation carried out at elevated temperatures since it has been found that polymers prepared from monomers containing such amounts of the chloroethyl compound are prone to evolve hydrogen chloride during such operations causing corrosion of the equipment, particularly the metal parts thereof.

The process of the invention is an extraction process characterized by the use of furfural or a suitable alkyl derivative of furfural, 2-methyl- or 5-methyl furfural, for example, as the extracting agent. It has been found that the solvent power of furfural for aromatic compounds containing side chain halogen is relatively greater than its solvent power for vinyl aromatic compounds free of side chain halogen and the invention is based on this discovery. Furfural, of course, has been employed heretofore as a selective solvent, for example, in the separation of paraffinic and naphthenic constituents of petroleum oil, but the literature, patent or otherwise, does not suggest that it is applicable to the separation of compounds of the type here involved.

Although it is adapted to stepwise continuous operation, the process is usually carried out batchwise. In accordance therewith, the mixture containing an alkaryl compound comprising a side chain halogen atom and an aromatic compound free of side chain halogen but having an unsaturated side chain is contacted with the furfural in the presence of a low molecular weight water-soluble alcohol such as ethanol or methanol, the former being preferred. The alcohol, it has been found, promotes the selectivity of the furfural and aids in its separation from the treated mixture.

The furfural and the alcohol may be separately added to the mixture to be extracted in which event it is best to add the furfural first, but it has been found advantageous to premix the two solvents in suitable proportioins.

The substantially homogeneous solution following upon the addition of the furfural and alcohol is caused to stratify by the addition of water or a mixture of water and alcohol, water alone being normally employed. The water and the two solvents, together with the extracted compound or compounds, form a separate layer which may be readily separated by decantation or in any other suitable way following which the extraction may or may not be repeated one or more times, as necessary. Preferably, the raffinate or non-aqueous layer, before drying, as over potassium carbonate, is subjected to one or more washes with aqueous alcohol and to a final water wash.

In the practice of the process, the relative proportions of the furfural and alcohol may vary within wide limits, but mixtures containing from 25 to 75% by volume of the furfural are normally used. A mixture of equal volumes of unsubstituted furfural and ethanol has been found particularly advantageous with respect to the reaction mixtures above mentioned resulting upon the dehydrochlorination of chloroethyl benzene or chloroethyl dichlorobenzene where the crude material has been subjected to a preliminary distillation.

It has been found that a reduced extraction effect obtains when extremely large proportions of alcohol relative to the furfural are used. On the other hand, when an excess of the furfural is employed, 9 volumes for each volume of alcohol for example, difficulties are sometimes encountered in achieving clean-cut stratification and in freeing the raffinate of the furfural.

The total volume of the mixed solvents employed in the extraction depends chiefly on the content of the haloalkyl aromatic compound or compounds. In general, the greater the side chain halogen content of the mixture to be treated, the greater the amount of the mixed solvents employed. In some instances, the volume of the mixed solvents may be equal to not more than one-tenth the volume of the material extracted, whereas in other instances as much as 5 volumes of the mixed solvents must be used in order to attain adequate separation of the haloalkyl aromatic component. In treating the reaction mixture resulting upon the dehydrochlorination of chloroethyl dichlorobenzene to obtain dichlorostyrene, it has been found that if the crude reaction product is first distilled, from 1 to 2 volumes of a 1:1 by volume mixture of unsubstituted furfural and ethanol is generally sufficient to remove all but a small part of the chloroethyl dichlorobenzene not removed by the distillation.

During the addition of water to bring about stratification of the treated mixture, the same should be continuously stirred or otherwise agitated. Alcohol is normally added to the water only where the furfural-alcohol mixture was deficient in alcohol. In the usual operation about 3 volumes of water are added for each volume of homogeneous solution.

In the washing of the raffinate with aqueous alcohol which has as its purpose to remove substantially the last traces of the furfural, solutions containing approximately 20% of alcohol are preferable but satisfactory results may be obtained using solutions having a higher or lower concentration of alcohol. Solutions containing less than 5% or more than 30% alcohol, however, are generally inefficient. The final water wash should be repeated as often as necessary to insure adequate removal of alcohol.

Each step of the process is normally carried out at room temperatures, but in some cases higher or lower temperatures may be advantageous.

The practice of the invention is further illustrated by the following examples which are not to be taken as in any way restrictive of the scope thereof.

Example I 70 parts by volume of dichlorostyrene prepared by dehydrochlorination of chloroethyldichlorobenzene was dissolved in a mixture consisting of 70 parts by volume of ethanol and 70 parts by volume of furfural. The solution was agitated with 300 parts by volume of water and allowed to separate. The raffinate layer was washed three times with a mixture of 70 volumes of alcohol and 300 volumes by water, separated and dried over potassium carbonate, the dried dichlorostyrene being passed through a column of activated alumina in order to remove the last traces of furfural. The side-chain chlorine content of the crude dichlorostyrene was 0.40% representing 2.4% of chloroethyl dichlorobenzene, whereas the treated dichlorostyrene contained only 0.03% of side-chain chlorine.

Example II

Another sample of dichlorostyrene having a side-chain chlorine content of 0.52% corresponding to 3.1% of chloroethyl dichlorobenzene was treated by the same procedure as described in Example I. The side-chain chlorine content was reduced to 0.056%.

Example III 80 volumes of styrene containing approximately 1.5% of alphachloroethylbenzene was mixed with 160 volumes of furfural-ethanol mixture (1:1 by volume) and the solution shaken with 300 volumes of water. After separation of the aqueous layer, the raffinate was further treated with a mixture of 80 volumes of ethanol and 400 volumes of water and this treatment was repeated two more times. After drying the raffinate with potassium carbonate, the styrene was passed through a column of activated alumina. The product was a clear colorless oil having a side-chain chlorine content of 0.029% compared with an original value of 0.388%. In a subsequent experiment in which the same procedures were followed the side-chain chlorine content was reduced to .018%.

Example IV

A sample of styrene containing approximately 2.5% of alphachloroethylbenzene and showing a side-chain chlorine content of 0.713% was treated as described in Example III. The side-chain chlorine content was thereby reduced to 0.064%.

Example V 60 parts by volume of dichlorostyrene containing 4.59% side-chain chlorine, corresponding to 27.08% chloroethyl dichlorobenzene, was mixed with 60 volumes of furfural and 60 parts of ethyl alcohol. The solution was agitated with 300 volumes of water and the oil which separated on standing, was washed with a mixture of 60 volumes of ethyl alcohol and 300 volumes of water. This alcohol-water wash was repeated two more times followed by three washes with plain water. The oil was then dried with potassium carbonate and passed through activated alumina. The resulting dichlorostyrene contained 3.74% side-chain chlorine by analysis, or 22.06% chloroethylidichlorobenzene.

Example VI 60 volumes of crude dichlorostyrene containing 27.08% chloroethyl dichlorobenzene was treated three times with a mixture of 60 volumes of furfural and 60 volumes of ethyl alcohol, the oil being separated after each treatment as before through the addition of 300 volumes of water. Further treatment conformed with Example V. The resulting dichlorostyrene contained 2.66% side-chain chlorine equivalent to 15.69% chloroethyl dichlorobenzene.

Reduction of side-chain chlorine from 4.59% to 2.66% in three successive treatments with furfural-alcohol demonstrated that this procedure can be adapted to step-wise countercurrent extraction for removing chloroethyl dichlorobenzene efficiently from dichlorostyrene.

I claim:

1. Method of treating a mixture containing an alkaryl compound having a side chain halogen atom and an aromatic compound free of side chain halogen atoms but having an unsaturated side chain to reduce the content of the alkaryl compound, which comprises contacting the mixture in the presence of a low molecular weight water-soluble alcohol with a solvent from the group consisting of furfural and alkyl derivatives of furfural, and through the agency of water causing stratification of the mixture with the formation of an aqueous layer comprising a major portion of the solvent and a substantial portion of the alkaryl compound.

2. Method of treating a mixture containing chloroethyl dichlorobenzene and dichlorostyrene to reduce the content of chloroethyl dichlorobenzene, which comprises contacting the mixture in the presence of ethanol with furfural and through the agency of water causing stratification of the mixture with the formation of an aqueous layer comprising a major portion of the furfural and a substantial portion of the chloroethyl dichlorobenzene.

3. Method of treating a mixture containing chloroethyl benzene and styrene to reduce the content of chloroethyl benzene, which comprises contacting the mixture in the presence of ethanol with furfural and through the agency of water causing stratification of the mixture with the formation of an aqueous layer comprising a major portion of the furfural and a substantial portion of the chloroethyl benzene.

4. Method of treating a mixture containing an alkaryl compound having a side-chain halogen atom and an aromatic compound free of side-chain halogen atoms but having an unsaturated side chain to reduce the content of the alkaryl compound which comprises contacting the mixture in the presence of a low molecular weight water soluble alcohol with a solvent of the group consisting of furfural and alkyl derivatives of furfural, the ratio of the furfural solvent to the alcohol being within the range of 1:3 to 9:1 and the total volume of the two being within the range of $\frac{1}{10}$ to 5 times that of the mixtures being treated, and adding water to the mixture in an amount sufficient to effect stratification thereof with the formation of an aqueous layer comprising a major portion of the solvent and a substantial portion of the alkaryl compound.

5. Method of treating a mixture containing chloroethyl dichlorobenzene and dichlorostyrene to reduce the content of chloroethyl dichlorobenzene which comprises contacting the mixture in the presence of ethanol with furfural, the amounts of furfural and ethanol being substantially equal and the total volume of the two being within the range of 1 to 2 times that of the mixture being treated, and adding water to the mixture in an amount sufficient to cause stratification thereof with the formation of an aqueous layer comprising a major portion of the solvent and a substantial portion of the chloroethyl dichlorobenzene.

6. Method of treating a mixture containing chloroethyl benzene and styrene to reduce the content of the chloroethyl benzene which comprises contacting the mixture in the presence of ethanol with furfural, the amounts of furfural and ethanol being substantially equal and the total volume of the two being within the range of 1 to 2 times that of the mixture being treated, and adding water to the mixture in an amount sufficient to cause stratification thereof with the formation of an aqueous layer comprising a major portion of the solvent and a substantial portion of the chloroethyl benzene.

BENJAMIN B. SCHAEFFER.

REFERENCES CITED

The following references are of record in the file of this patent:

UNITED STATES PATENTS

| Number | Name | Date |
| --- | --- | --- |
| 2,265,312 | Quattlebaum et al. | Dec. 9, 1941 |
| 2,432,737 | Erickson et al. | Dec. 16, 1947 |